United States Patent Office 3,454,638
Patented July 8, 1969

3,454,638
ADULT HOUSEFLY CONTROL AGENTS
Jack D. Early, Bethesda, Md., and John P. Chupp, Kirkwood, Mo., assignors to Monsanto Company, St. Louis, Mo., a corporation of Delaware
No Drawing. Original application Oct. 13, 1965, Ser. No. 495,697. Divided and this application Aug. 8, 1967, Ser. No. 659,047
Int. Cl. C07c 103/30; A01n 9/20
U.S. Cl. 260—559            3 Claims

ABSTRACT OF THE DISCLOSURE

Compounds of the class 3-(4-halophenyl)-3'-trifluoromethyl-4'-halo-5-halosalicylanilide useful in the control of adult houseflies.

This application is a division of copending application Ser. No. 495,697, filed Oct. 13, 1965.

This invention relates to a method of destroying adult houseflies employing as the active agent a substituted 3-phenylsalicylanilide of the formula

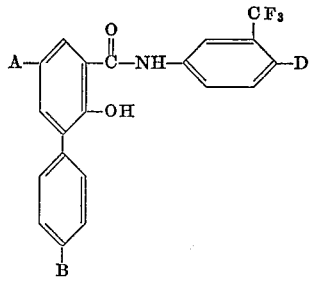

wherein A and B are halogen of atomic weight in the range of 35 to 80 and wherein D is halogen of atomic weight in the range of 18 to 80, for example 4',5-dichloro-3'-trifluoromethyl-3-(4-chlorophenyl) salicylanilide,
4',5-dichloro-3'-trifluoromethyl-3-(4-bromophenyl) salicylanilide,
4'-bromo-5-chloro-3'-trifluoromethyl-3-(4-chlorophenyl) salicylanilide,
4'-fluoro-5-chloro-3'-trifluoromethyl-3-(4-chlorophenyl) salicylanilide,
4',5-dibromo-3'-trifluoromethyl-3-(4-chlorophenyl) salicylanilide, and the like.

As illustrative of the preparation of these new adult housefly agents is the following:

EXAMPLE I

To a suitable reaction vessel equipped with a thermometer, agitator and reflux condenser is charged 14.1 parts by weight of 5-chloro-3-(4-chlorophenyl)salicylic acid and 111 parts by weight of chlorobenzene. The so-charged mass is heated to about 70° C. and thereto is added with agitation 7.6 parts by weight of 3-trifluoromethyl-4-chloroaniline followed by 2.5 parts by weight of phosphorus trichloride. The mass is then heated to reflux (about 135° C.) and refluxed for about five hours. The reaction mass is then cooled to about 70° C. and thereto is added 50 parts by weight of water followed by 50 parts by weight of 20% hydrochloric acid. The mass is then permitted to stand for about 15 minutes, whereupon the organic layer is removed and washed first with water and then with dilute aqueous sodium bicarbonate and finally with water. The so-washed organic layer is then stripped of volatiles. The residue is then recrystallized from benzene to give 4',5 - dichloro - 3' - trifluoromethyl-3-(4-chlorophenyl)salicylanilide, M.P. 166–169° C.

EXAMPLE II

Employing the procedure of Example I but replacing 3-trifluoromethyl-4-chloroaniline with an equimolecular amount of 3-trifluoromethyl-4-fluoroaniline there is obtained 4' - fluoro-5-chloro-3'-trifluoromethyl-3-(4-chlorophenyl)salicylanilide, M.P. 145–147° C.

In a similar manner to that of Example I the analogue 3',4',5 - trichloro-3-(4-chlorophenyl)salicylanilide, M.P. 193–194° C., is prepared from 3,4-dichloroaniline and 5 - chloro - 3 - (4 - chlorophenyl)salicylic acid, and the analogue 3' - trifluoromethyl-5-chloro-3-(4-chlorophenyl) salicylanilide, M.P. 148–149° C., from 3-trifluoromethylaniline and 5-chloro-3-(4-chlorophenyl)salicylic acid, and the analogue 4',5 - dichloro-3-(4-chlorophenyl)salicylanilide, M.P. 173–174° C., from 4-chloroaniline and 5-chloro-3-(4-chlorophenyl)salicylic acid.

As illustrative of the adult housefly activity of the compounds of this invention as compared to analogues thereof is the following:

A 1.0% by weight concentrate was prepared by dissolving the compound to be evaluated in 10 ml. of acetone. This solution was diluted with 90 ml. of water containing 0.01% of isooctylphenyl polyethoxyethanol nonionic surfactant. A syringe was filled with this mixture and placed in a microinjection apparatus. The injector level was pressed once to deliver one microliter which was applied directly to the thorax of one female adult fly, *M. domestica*, in a plastic tube. This procedure was conducted 5 times for each compound at the same concentration, which is one microgram per microliter. A period of 24 hours at room temperature was allowed to lapse after application and a count made to determine living and dead flies. The following results were obtained.

| Compound: | No. of dead flies |
|---|---|
| 4',5 - dichloro - 3' - trifluoromethyl - 3-(4-chlorophenyl)salicylanilide | 5 |
| 4' - fluoro-5-chloro-3'-trifluoromethyl-3-(4-chlorophenyl)salicylanilide | 5 |
| 3',4',5 - trichloro - 3 - (4 - chlorophenyl)salicylanilide | 0 |
| 4',5-dichloro-3-(4-chlorophenyl)salicylanilide | 0 |
| 5 - chloro - 3'-trifluoromethyl-3-(4-chlorophenyl) salicylanilide | 0 |

What is claimed is:
1. A substituted 3-phenylsalicylanilide of the formula

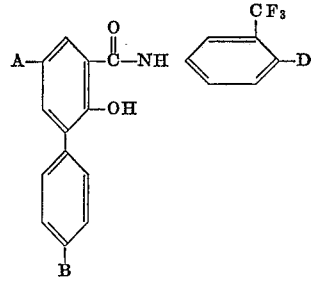

wherein A and B are halogen of atomic weight in the range of 35 to 80 and wherein D is halogen of atomic weight in the range of 18 to 80.
2. A compound of claim 1 wherein A, B and D, respectively, are chloro.

3. A compound of claim 1 wherein A and B, respectively, are chloro and wherein D is fluoro.

References Cited

UNITED STATES PATENTS 3,249,637  5/1966  Early et al. -------- 260—559

HENRY R. JILES, *Primary Examiner.*

HARRY I. MOATZ, *Assistant Examiner.*

U.S. Cl. X.R.

424—230